US007850807B2

(12) United States Patent
Orberg et al.

(10) Patent No.: US 7,850,807 B2
(45) Date of Patent: Dec. 14, 2010

(54) METHOD FOR RESTORING A RADIAL CLEARANCE BETWEEN THE STATOR AND ROTOR PARTS OF A TURBOGENERATING SET

(75) Inventors: Aleksey Nikolaevich Orberg, St. Petersburg (RU); Sergei Nikolaevich Snegurov, St. Petersburg (RU); Vladimir Borisovich Sudarev, St. Petersburg (RU); Sergey Ivanovich Tretyakov, St. Petersburg (RU)

(73) Assignee: Zakrytoe Aktsionernoe Obshchestvo "ORMA", St. Petersburg (RU)

( * ) Notice: Subject to any disclaimer, the term of this patent is extended or adjusted under 35 U.S.C. 154(b) by 209 days.

(21) Appl. No.: 12/227,525

(22) PCT Filed: Jun. 1, 2007

(86) PCT No.: PCT/RU2007/000293

§ 371 (c)(1), (2), (4) Date: Nov. 20, 2008

(87) PCT Pub. No.: WO2008/039102

PCT Pub. Date: Apr. 3, 2008

(65) Prior Publication Data

US 2009/0250155 A1 Oct. 8, 2009

(30) Foreign Application Priority Data

Sep. 26, 2006 (RU) .............................. 2006134598

(51) Int. Cl.
*B32B 37/00* (2006.01)

(52) U.S. Cl. .................... 156/94; 29/402.04; 29/402.18

(58) Field of Classification Search ................... 156/94, 156/95, 98, 330; 29/402.01, 402.04, 402.18
See application file for complete search history.

(56) References Cited

U.S. PATENT DOCUMENTS 5,935,360 A * 8/1999 Griggs ........................ 156/94
2004/0231155 A1* 11/2004 Le Saint et al. ............ 29/889.1

* cited by examiner

*Primary Examiner*—Khanh Nguyen
*Assistant Examiner*—John Blades
(74) *Attorney, Agent, or Firm*—The Nath Law Group; Jerald L. Meyer

(57) ABSTRACT

The invention relates to power engineering, in particular to a method for restoring a radial clearance between the stator and rotor parts of a turbogenerating set during reparation of the flow section thereof. The inventive method for restoring a radial clearance between the stator and rotor parts of a turbogenerating set, consists in mounting a temporary shroud, which is made of a sheet material and the thickness of which corresponds to a clearance size, on the rotor blades of a demounted rotor, in fixing a protective cover made of a composite material to said shroud, in applying a polymer sable epoxy resin material to the internal surface of the stator and to the protective cover of the blade shroud, in mounting the rotor in the stator and, said resin being polymerized, in removing the shroud and excess of resin, projected in the axial direction during said mounting, from the rotor Said invention makes it possible to reduce labor input for the turbogenerating set maintenance and repair.

4 Claims, 1 Drawing Sheet

METHOD FOR RESTORING A RADIAL CLEARANCE BETWEEN THE STATOR AND ROTOR PARTS OF A TURBOGENERATING SET

FIELD OF THE INVENTION

This invention relates to power engineering, in particular to a method for restoring a radial clearance between the stator and rotor parts of a turbo-generator set during repair of its flow section.

PRIOR ART

A method for sealing radial clearances between the stator and rotor parts of turbine-driven machines is known, which comprises arranging a sheet sealing element made as multi-layer composite material having a base clad on both sides with foil, wherein on one side nickel foil is used, soldering said sealing element to the stator, and separating foil from the base on the rotor side, wherein a sheet sealing element is used which base is clad with iron foil over a powder graphite layer (see RU Patent # 1524309, B22F7/04, 20.09.2005).

The known method has several disadvantages, namely:

- mechanical treatment of a sheet composite sealing element is necessary after removing foil from the rotor side;
- low resistance to erosion of a composite material due to the absence of a special protective coating.

The closest to this invention as to its technical essence and achieved result is a method for forming a radial clearance between the stator and rotor parts of a turbo-generator set, comprising coating the inner part of the body with a strip (equal to a projection of the vane width on its periphery to the rotor axis) of a special soft layer, wherein a graphite-, talc-, asbestos-, powder aluminum-based, etc. coating may be used. The said materials and special varnishes are used for making a paste which is applied to the rough surface of the body (or the ring carrying turning vanes), dried and turned with a cutting tool. If a radial clearance is determined incorrectly, the vane ends will touch the soft layer of the coating, tearing it and thus establishing a minimum radial clearance (Skubachevsky G. S. Aviation Gas-Turbine Engines. M.: "Machinostroyenie", 1974, p. 84-85—the prototype).

This known method has the following disadvantages:

- high labor-intensity of repair-and-restoration operations due to necessity of using specialized drying furnaces for drying a coating paste applied to the inner surface of the body and then mechanically treating the stator coating, which requires factory conditions and disassembling the whole turbine-driven unit.

SUMMARY OF THE INVENTION

The objective of this invention is to simplify the techniques used for restoration of a radial clearance between the stator and rotor parts of a turbo-generator set during repair and salvage operations.

The technical effect is lower labor-intensity of repair-and-restoration works on a turbo-generator set.

The stated objective can be achieved by carrying out the inventive method for restoring a radial clearance between the stator and rotor parts of a turbo-generator set, comprising installing a temporary shroud made of a sheet metal having a thickness equal to that of the clearance onto the blades of the removed rotor, a protective coating of a composite material is fixed to the shroud, an epoxy adhesive-based polymerizing material is applied on the stator inner surface and on the protective coating fixed to the rotor blades, the rotor is installed into the stator, and, after polymerization of the adhesive, the shroud is removed from the rotor, and excess adhesive, which may project in the axial direction during installing the rotor into the stator, is removed.

When carrying out this method it is preferable to use sheet steel as a sheet metal for a shroud.

When carrying out this method it is preferable to use a glass cloth or Kevlar with a heat resistant filler as a composite material of a protective coating.

When carrying out this method it is preferable to polymerize an epoxy adhesive at 15 to 35° C. for 72 hours.

DESCRIPTION OF A PREFERRED EMBODIMENT

Figure 1:
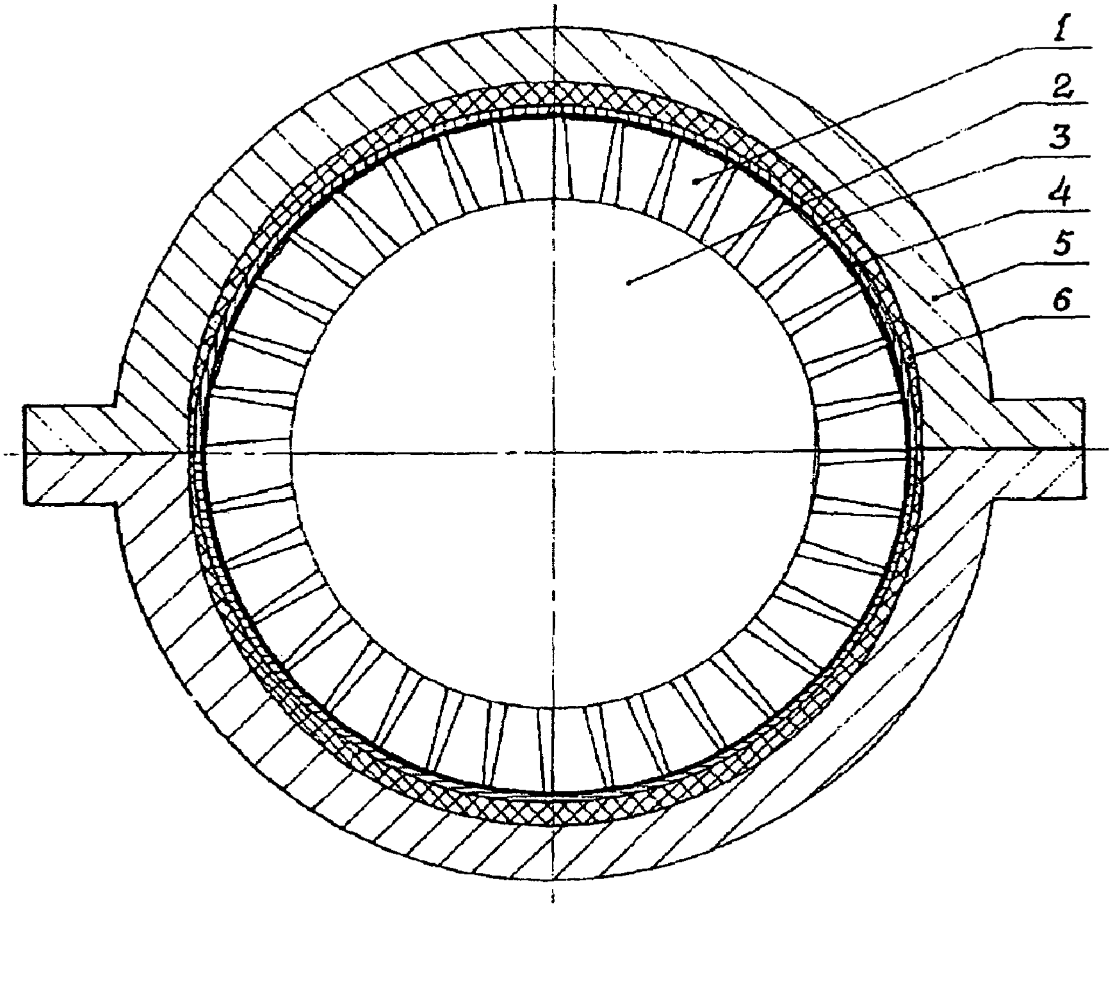
FIG. 1 schematically shows the rotor and the stator of a turbo-generator set after restoring a radial clearance therebetween.

During repair-and-restoration works the rotor 2 is removed from the stator 5. Then a temporary shroud 3, which may be made of sheet steel, e.g., ST3 steel and may have a thickness corresponding to a predetermined clearance between the blades 1 of the rotor 2 and the surface of the stator 5, is installed onto the blades 1 of the removed rotor 2; then a protective coating 4 made of a composite material, e.g., of a glass cloth or Kevlar with a heat resistant filler, is fixed to the shroud 3.

Then a polymerizing material 6 made of an epoxy adhesive is applied to the inner surface of the stator 5 and to the protective coating 4 fixed to the shroud 3 installed onto the blades 1 of the rotor 2, and the rotor 2 is installed into the stator 5. After polymerization of the adhesive, which is carried out at 15-35° C. for 72 hours, the rotor 2 is removed from the stator 5, the shroud 3 is removed from the rotor 2, and excess polymerizing material 6 made of the epoxy adhesive, which may project in the axial direction during installing the rotor 2 into the stator 5, is removed, after which the rotor 2 is installed into the stator 5 for future operation.

Of significant importance is that all the technological operations comprised by the inventive method for restoring a radial clearance between the stator and rotor parts of a turbo-generator set, namely: installing a temporary shroud 3 made of a sheet metal, preferably of a sheet steel having a thickness corresponding to the clearance, onto the blades 1 of the removed rotor 2; fixing a protective coating made of a composite material, preferable of a glass cloth or Kevlar with a heat resistant filler; applying a polymerizing material 6 onto the inner surface of the stator 5 and onto the protective coating 4 fixed to the shroud 3 on the blades 1 of the rotor 2; installing the rotor 2 into the stator 5; and removing, after drying the polymerizing material 6, the shroud 3 from the rotor 2 and the excess polymerizing material 6 projected in the axial direction during installing the rotor 2 into the stator 5; may be carried out during repair-and-restoration works directly at the place where a turbo-generator set is operated.

Furthermore, the use of an epoxy adhesive as the polymerizing material 6 and polymerization of the epoxy adhesive at 15-35° C. for 72 hours preclude the necessity of disassembling the whole turbo-generator set and a need in specialized drying furnaces.

INDUSTRIAL APPLICABILITY

This invention may be used in power engineering when repairing the flow section of a turbo-generator set.

What is claimed is:

1. A method for restoring a radial clearance between the stator and rotor parts of a turbo-generator set, comprising installing a temporary shroud made of a sheet metal and having a thickness corresponding to said clearance onto the blades of the removed rotor; fixing a protective coating made of a composite material; applying a polymerizing material made of an epoxy adhesive onto the inner surface of the stator and onto said protective coating fixed to the shroud on the blades of the rotor; installing the rotor into the stator; and removing, after polymerization of said adhesive, the shroud from the rotor and excess adhesive projected in the axial direction during installing the rotor into the stator.

2. A method according to claim 1, characterized in that sheet steel is used as a sheet metal for making said shroud.

3. A method according to claim 1, characterized in that a glass cloth or Kevlar with a heat resistant filler is used as a composite material for making said protective coating.

4. A method according to claim 1, characterized in that said epoxy adhesive is polymerized at 15-35° C. for 72 hours.

* * * * *